(12) United States Patent
Sauti et al.

(10) Patent No.: US 10,500,836 B2
(45) Date of Patent: Dec. 10, 2019

(54) ADHESION TEST STATION IN AN EXTRUSION APPARATUS AND METHODS FOR USING THE SAME

(71) Applicant: U.S.A. as represented by the Administrator of the National Aeronautics and Space Administration, Washington, DC (US)

(72) Inventors: Godfrey Sauti, Hampton, VA (US); Jae-Woo Kim, Newport News, VA (US); Emilie J. Siochi, Newport News, VA (US); John M. Gardner, Newport News, VA (US); Christopher J. Stelter, Newport News, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 142 days.

(21) Appl. No.: 15/345,118

(22) Filed: Nov. 7, 2016

(65) Prior Publication Data

US 2017/0129186 A1 May 11, 2017

Related U.S. Application Data

(60) Provisional application No. 62/251,947, filed on Nov. 6, 2015.

(51) Int. Cl.
*B33Y 10/00* (2015.01)
*B33Y 50/02* (2015.01)
(Continued)

(52) U.S. Cl.
CPC ............ *B33Y 50/02* (2014.12); *B29C 64/106* (2017.08); *B29C 64/386* (2017.08); *B33Y 10/00* (2014.12); *B29C 64/171* (2017.08); *B29C 64/182* (2017.08)

(58) Field of Classification Search
CPC ... B29C 64/171; B29C 64/182; B29C 64/386; B29C 64/106; B33Y 10/00; B33Y 50/02
See application file for complete search history.

(56) References Cited

U.S. PATENT DOCUMENTS 2,356,841 A   8/1944 Gregory
2,544,673 A   3/1951 Bernard
(Continued)

OTHER PUBLICATIONS

Extrusion of Thermosets by UNSW School of Engineering (Year: 2013).*
(Continued)

*Primary Examiner* — Abbas Rashid
*Assistant Examiner* — S. Behrooz Ghorishi
(74) *Attorney, Agent, or Firm* — Jennifer L. Riley; Robin W. Edwards (57) ABSTRACT

A method of controlling an additive fabrication process includes providing a primary substrate and a test substrate. Polymer test material is extruded onto the test substrate utilizing an extrusion head. The extrusion head is moved relative to the test substrate, and a force required to move the extrusion head relative to the test substrate is measured to thereby generate test data. A part is fabricated by extruding polymer material onto the primary substrate utilizing the extrusion head. The test data is utilized to control at least one process parameter associated with extruding polymer material onto the primary substrate.

17 Claims, 9 Drawing Sheets

(51) Int. Cl.
  *B29C 64/106* (2017.01)
  *B29C 64/171* (2017.01)
  *B29C 64/182* (2017.01)
  *B29C 64/386* (2017.01)

(56) References Cited

U.S. PATENT DOCUMENTS

| | | | |
|---|---|---|---|
| 2,821,253 | A | 1/1958 | Heffelfinger |
| 2,871,622 | A | 2/1959 | Edward et al. |
| 3,763,561 | A | 10/1973 | Scharfenberger |
| 4,169,398 | A | 10/1979 | Wadsworth et al. |
| 4,248,114 | A | 2/1981 | Alexander et al. |
| 4,557,049 | A | 12/1985 | Cribbs et al. |
| 4,984,727 | A | 1/1991 | Jimenez |
| 5,044,235 | A | 9/1991 | Lehner |
| 5,121,329 | A | 6/1992 | Crump |
| 5,176,028 | A | 1/1993 | Humphrey |
| 5,448,186 | A | 9/1995 | Kawata |
| 5,500,505 | A | 3/1996 | Jones |
| 5,873,291 | A | 2/1999 | Sand |
| 6,282,950 | B1 | 9/2001 | Taylor, Jr. |
| 6,518,330 | B2 | 2/2003 | White et al. |
| 6,735,870 | B2 | 5/2004 | Sand |
| 6,934,600 | B2 | 8/2005 | Jang |
| 7,137,761 | B2 | 11/2006 | Hara et al. |
| 7,297,304 | B2 | 11/2007 | Swanson et al. |
| 7,799,849 | B2 | 9/2010 | Raravikar et al. |
| 8,221,669 | B2 | 7/2012 | Batchelder |
| 8,347,723 | B2 | 1/2013 | Questo et al. |
| 8,452,073 | B2 | 5/2013 | Taminger et al. |
| 9,126,367 | B1 * | 9/2015 | Mark ................. B29C 70/20 |
| 2009/0294022 | A1 | 12/2009 | Hayes et al. |
| 2012/0036977 | A1 | 2/2012 | Vaniglia |
| 2013/0233471 | A1 | 9/2013 | Kappesser et al. |
| 2013/0255084 | A1 | 10/2013 | Hasegawa et al. |
| 2014/0061974 | A1 | 3/2014 | Tyler |
| 2014/0117575 | A1 * | 5/2014 | Kemperle ............ B29C 47/92 264/40.7 |
| 2014/0249773 | A1 | 9/2014 | Beuth, Jr. |
| 2014/0268604 | A1 | 9/2014 | Wicker et al. |
| 2014/0291886 | A1 | 10/2014 | Mark et al. |
| 2015/0044383 | A1 | 2/2015 | Kim |
| 2015/0108677 | A1 | 4/2015 | Mark et al. |
| 2015/0174824 | A1 * | 6/2015 | Gifford ............. B29C 67/0085 425/183 |
| 2015/0275129 | A1 * | 10/2015 | Patil ................. C10M 105/72 508/516 |
| 2015/0306665 | A1 * | 10/2015 | Sidhu ................ B22F 3/1055 427/540 |
| 2018/0290386 | A1 * | 10/2018 | DeCiccio ............ B33Y 70/00 |

OTHER PUBLICATIONS

Iljima, Sumio, "Helical Microtubules of Graphitic Carbon", Letter to Nature, Nov. 7, 1991, pp. 56-58, vol. 354.
Dresselhaus, Mildred S. et al., Carbon Nanotubes Synthesis, Structures, Properties and Applications (T. W. Ebbesen. Ed. 1991). Chapter 2, Relation of Carbon Nanotubes to Other Carbon Materials, Graphite p. 14; Chapter 3; Nanotube Growth and Characterization, p. 29 and Chapter 6, Electronic Properties and Defects, p. 118.
Koratkar, Nikhil A. et at., "Multifunctional Structural Reinforcement. Featuring Carbon Nanotube Films", Compos. Sci. and Technol. (2003) pp. 1525-1531; vol. 63.
Atkinson, Ken R. et al., "Multifunctional Carbon Nanotube Yarns and Transparent Sheets: Fabrication, Properties, and Applications", Physics B (2007) pp. 339-343, vol. 394.
Qui, Jingjing et al., "Carbon Nanotube Integrated Multifunctional Multiscale Composites", Nanotechnology (2007) pp. 1-11, vol. 18, 275708.
Kaemogebm M. et al., Multifunctional Carbon Nanotube Networks for Fuel Cells, Appl. Phys. Lett. (2008) pp. 094103-1-094103-3, vol. 92, 094103.
Lee, Woo Il et al., Microwave Curing of Composites, J. Comps. Mater (1984) 387-409, vol. 18, Technomic Publishing Co.
Dresselhaus, M. S. et al., "Physics of Carbon Nanolubes", (1995) Carbon, pp. 883-891, vol. 33, No. 7.
Park, Cheol et al., "Dispersion of Single Wall Carbon Nanotubes by in Situ Polymerization Under Sonication", Chem. Phys. Lett. (2002) pp. 303-308, vol. 364.
Thostenson, E. T. et al., "Processing-structure-multi-functional Property Relationship in Carbon Nanotube/epoxy Composites", (2006) Carbon, pp. 3022-3029 vol. 44.
Ma, Peng-Cheng et al., "Dispersion and Functionalization of Carbon Nanotubes for Polymer-based Nanocomposites: A Review", Composites: Part A (2010) pp. 1345-1367, vol. 41.
De Volder, Michael F. L. et al. "Carbon Nanotubes: Present and Future Commercial Applications", Science (2013) pp. 535-539, vol. 339.
Gurau, Michael, "Part 2: The world's First Commercial All-CNT Sheets, Tape and Yarns", archived at http://www.nanocomptech.com/blog/need-to-know-part-2-sheets-tape-yarn, accessed Apr. 17, 2016.
Qunfeng, Cheng et al., "High mechanical performance composite conductor: multi-walled carbon nanotube sheet/ bismaleimide nanocomposites", Adv. Funct. Mater. (2009) pp. 3219-3225, vol. 19.
Qunfeng, Cheng et al., "Functionalized Carbon-Nanotube Sheet/ Bismaleimide Nanocomposites: Mechanical and Electrical Performance Beyond Carbon-Fiber Composites", Small (2010) pp. 763-767, vol. 6.
Kim, Jae-Woo et al., "Polyaniline/carbon Nanotube Sheet Nanocomposites: Fabrication and Characterization", ACS Appl. Mater. Interfaces (2013) pp. 8597-8606, vol. 5.
Kim, Jae-Woo et al., "Toward High Performance Thermoset/Carbon Nanotube Sheet Nanocomposites via Resistive Heating Assisted Infiltration and Cure", ACS Appl. Mater. Interfaces (2014) pp. 18832-18843, vol. 6.
Downs, Rebekah et al., "Strain-Induced Alignment Mechanisms of Carbon Nanotube Networks", Adv. Eng. Mater. (2015) pp. 349-358, vol. 17.
Harvey, Stefanie E., "Carbon as Conductor: A Pragmatic Review", Proceedings of the 61st IWCS Conference (2013) pp. 558-562.
Behabtu, Natnael et al., "Strong, Light, Multifunctional Fibers of Carbon Nanotubes with Ultrahigh Conductivity", Science (2013) pp. 182-186, vol. 339.
Bak, David, "Rapid Prototyping or Rapid Production? 3D Printing Processes Move Industry Towards the Latter", Assembly Automation (2003) pp. 340-345, vol. 23.
Jones, Rhys. et al., "RepRap—the Replicating Rapid Prototyper", Robotica (2011) pp. 177-191, vol. 29.
Espalin, D. et al., "3D Printing Multifunctionality: Structures with Electronics", Int. J. Adv. Manuf. Technol, (2014) pp. 963-978, vol. 72.
Tymrak, B. M. et al., "Mechanical Properties of Components Fabricated with Open-source 3-D Printers Under Realistic Environmental Conditions", Materials & Design (2014) pp. 242-246, vol. 58.
Garcia-Tunon, E. et al., "Printing in Three Dimensions with Graphene", Adv. Mater. (2015) pp. 1668-1693, vol. 27.
Kim, J. H. et al, 3D Printing of Reduced Graphene Oxide Naniowires, Adv. Mater. (2015) 157-161, vol. 27.
Nikzad, M. et al, "Thermo-mechanical Properties of a Highly Filled Polymeric Composites for Fused Deposition Modeling", Materials & Design (2011) pp. 3448-3456, vol. 32.
Walker, Brett S et al., "Reactive Silver Inks for Patterning High-conductivity Features at Mild Temperatures". J. Am. Chem. Sec. (2012) pp. 1419-1421, vol. 134.
Campbell, Thomas A., et al., "The Next Wave: 4D Printing Programming the Material World", Brent Scowcroft Center on International Security Report, Atlantic Council (2014).
Meng, Fancheng et al., "Electro-Induced Mechanical and Thermal Responses of Carbon Nanotube Fibers", Adv. Mater. (2014) pp. 2480-2485, vol. 26.
Namiki, M. et al., "3D Printing of Continuous Fiber Reinforced Plastic", SAMPE Conf. Proc., (2014) pp. 59-4328.

(56) References Cited

OTHER PUBLICATIONS

Dresselhaus, M. S., Dresselhaus, G. and Saito, R., Pergamon "Physics of Carbon Nanotubes," Carbon, vol. 33, No. 7, pp. 883-891, (1995).
Hoogenboom, R. et al., "Microwave-Assisted Polymer Synthesis: Recent Developments in a Rapidly Expanding Field of Research", Macromol. Rapid Commun., (2007) pp. 368-386, vol. 28.
Kumar, P. K. et al., "Development of Infrared rRadiation Curing System for Fiber Reinforced Polymer Composites: An Experimental Investigation", Indian J. Eng. Mater. Sci. (2011) pp. 24-30, vol. 18.
Levy, A. et al., "Ultrasonic Welding of Thermoplastic Composites: a Numerical Analysis at the Mesoscopic Scale Relating Processing Parameters, Flow of Polymer and Quality of Adhesion", Int. J. Mater. Form. (2014) pp. 39-51, vol. 7.
Bayerl, T. et al., "The Heating of Polymer Composites by Electromagnetic Induction—A review", Composites, Part A, pp. 27-40 (2014), vol. 57.
Kim, Jae-Woo et al., "Toward High Performance Thermoset/Carbon Nanotube Sheet Nanocomposites via Resistive Heating Assisted Infiltration and Cure", ACS Appl. Mater. Interfaces (2014) pp. 8832-13843, vol. 6.
This Line Not Used.
Soylemez, Emrecan et al., "Controlling Melt Pool Dimensions Over a Wide Range of Material Deposition Rates in Electron Beam Additive Manufacturing", Solid Freeform Fabrication Conference (2010) pp. 571-582.
Vasinonta, Aditad et al., "Process Maps for predicting residual stress andmelt pool size in the laser-based fabrication of thin-walled structures," J. Manuf., Sci. Eng (2006) pp. 101-109, vol. 129(1).
Beuth, J. et al., "The Role of process variables in laser-based metal solid freeform fabrication", N. JOM (2001) pp. 36-39, vol. 53.
Stiltner, Justin L. et al., "A Method for Creating Actuated Joints via Fiber Embedding in a Polyjet 3D Printing Process", 22nd Annual International Solid Freeform Fabrication Symposium, 2011.
Ge, Qi et al., "Active materials by four-dimension printing," cited as Applied Physics Letters (2013) pp. 131901, vol. 103.
Wool, Richard P., "Self-heating Materials: a Review", Soft Matter, 2008 pp. 400-418, vol. 4.
Liu, Ying et al., "Self-folding of Polymer Sheets Using Local Light Absorption", Soft Matter Feb. 14, 2012, pp. 1764-1769, vol. 8, No. 6.
Seufzer, William J., "Additive Manufacturing Modeling And Simulation", NASA/TM—2014—218245, Apr. 2014.
Beuth, Jack and Klingbeil, "The Role of Process Variables in Laser-Based Direct Metal Solid Freeform Fabrication", JOM, Sep. 2001, pp. 36-39.

\* cited by examiner

ADHESION TEST STATION IN AN EXTRUSION APPARATUS AND METHODS FOR USING THE SAME

CROSS-REFERENCE TO RELATED PATENT APPLICATION

This patent application claims the benefit of and priority to U.S. Provisional Patent Application No. 62/251,947, filed on Nov. 6, 2015 and entitled "ADHESION TEST STATION IN AN EXTRUSION APPARATUS AND METHODS FOR USING THE SAME," the entire contents of which is hereby incorporated by reference in its entirety.

STATEMENT REGARDING FEDERALLY SPONSORED RESEARCH OR DEVELOPMENT

The invention described herein was made in the performance of work under NASA contracts and by employees of the United States Government and is subject to the provisions of the National Aeronautics and Space Act, Public Law 111-314, § 3 (124 Stat. 3330, 51 U.S.C. Chapter 201) and 35 U.S.C. § 202, and may be manufactured and used by or for the Government for governmental purposes without the payment of any royalties thereon or therefore. In accordance with 35 U.S.C. § 202, the contractor elected not to retain title.

FIELD OF THE INVENTION

The present invention relates to extrusion and rapid prototyping devices used to make additively manufactured items. More particularly, it relates to an apparatus for the measurement and calibration of the adhesion between rows of extruded material, the adhesion between the extruded material and a substrate, and/or the deformation and flow of the extruded material, and for providing this information as feedback to enable closed-loop processing.

BACKGROUND OF THE INVENTION

Additive manufacturing ("3D printing") has generated significant interest, not only for rapid prototyping, but also for producing final articles. Additive manufacturing processes may involve extruding a polymer material or polymer coated fibers. The extruded material may be deposited in parallel rows in successive layers.

A number of devices and processes for adhesion testing have been developed. Examples of known devices are disclosed in Haber (U.S. Pat. No. 2,544,673), which discloses a method for testing bonding by changes in the capacitance; Miller (U.S. Pat. No. 4,137,761), which discloses a tilting table initial tack test apparatus for adhesive bonds; Humphrey (U.S. Pat. No. 5,176,028), which discloses a device for testing adhesive applied to overlapping portions of a two part sample; and Taylor, Jr et al. (U.S. Pat. No. 6,282,950), which discloses a method and apparatus for testing the bond strength of materials such as a coating on a substrate. The method includes applying a light curable adhesive. Questo et al. (U.S. Pat. No. 8,347,723) discloses a sonic resonator system for testing the adhesive bond strength of composite materials.

Despite these developments, existing test apparatus and processes may suffer from various drawbacks.

BRIEF SUMMARY OF THE INVENTION

The density of a 3D component influences the performance characteristics of the component. Thus, when utilizing polymeric resins for high value components, the ability to determine how well the extruded rows of resin adhere to each other and/or to a substrate is valuable in controlling the extrusion process. Similarly, if polymer coated fibers are used as a feedstock, it is helpful to know how well the coatings adhere the extruded rows to a substrate and/or to each other. Also, the process parameters and/or the quality of the resin or coated fiber feedstock can change with time during the fabrication (extrusion) process. Thus, characterization of interlayer and/or substrate adhesion is preferably performed during the extrusion process, and preferably at several intervals during the extrusion process.

According to one aspect of the present disclosure, an adhesion test station and method for using the same are provided for use with an extrusion bed. The adhesion test station may include an extrusion head, one or more clamps, one or more load cells, and a localized test area that is preferably much smaller than the extrusion bed. By isolating a small region of the extrusion bed, smaller and more accurate load cells can be used. Also, parameters such as the extrusion bed temperature can be quickly adjusted and the effects of the change in a given parameter with respect to force measurements can be isolated from other effects. The method preferably includes preparing the test area with a substrate material, running the extrusion head over the test station for one or more passes to lay down (deposit) extruded material in the localized test area. The method also includes clamping un-extruded material, withdrawing the extrusion head, and recording (measuring) the load as the extrusion head is withdrawn. The adhesion test station and method also provide a way to determine how cleanly the extruded material is being cut whenever it has to be terminated.

The present disclosure provides an integrated test mechanism for determining (measuring) adhesion between rows of extruded (e.g. coated) filaments. The mechanism may also be utilized to determine (measure) adhesion between extruded filament rows and a substrate. The adhesion test station may be used to measure adhesion at various points (times) during the extrusion process. The present disclosure also provides a mechanism for testing clean cutting of the extrusion filament during the processing. The present disclosure further provides a mechanism for testing the flow and deformation of an extruded filament. The test mechanism uses only a small amount of the material for testing. The present disclosure also provides for integration of information from the adhesion, cutting and flow/deformation test into the control parameters of the extrusion process.

The present disclosure includes a method of controlling a 3D printing process. The method includes providing a primary substrate and a test substrate. Polymer test material is extruded onto the test substrate utilizing an extrusion head. The extrusion head is moved relative to the test substrate, and a force required to move the extrusion head relative to the test substrate is measured to generate test data. A 3D part is printed by extruding polymer material onto the primary substrate in successive layers utilizing the extrusion head. The test data is utilized to control at least one process parameter of the 3D printing process.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
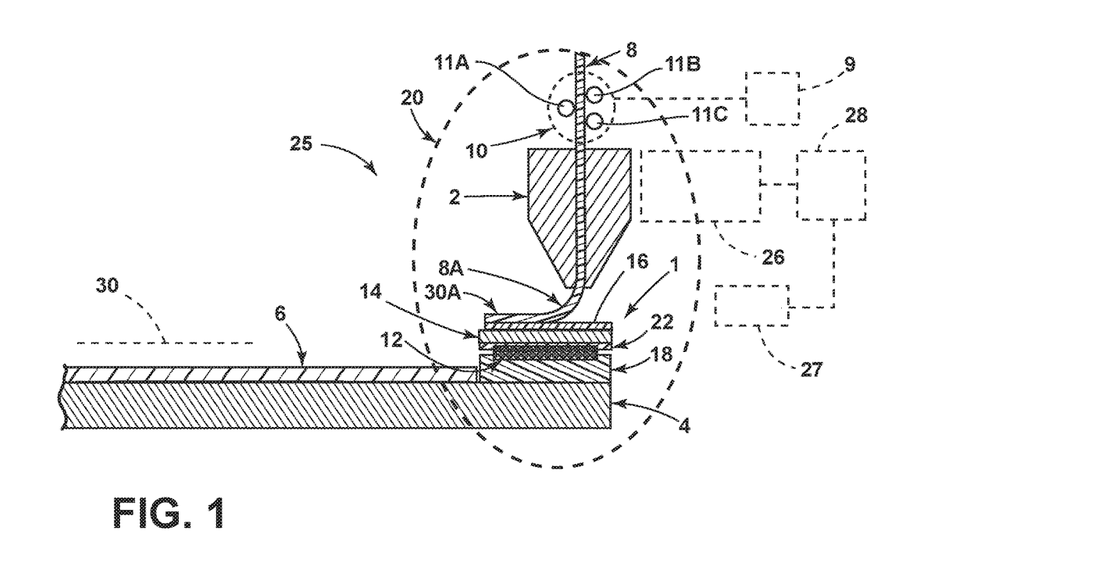
FIG. 1 is a partially schematic cross sectional view of an adhesion test/unit station and an associated extrusion apparatus.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure provides a test station/unit and process that may be utilized to verify the quality of articles fabricated by additive manufacturing processes, preferably during the production process. The test device/process permits early and quick adjustment of manufacturing parameters to minimize or prevent defects or other anomalies. The test device/process may be utilized in connection with extrusion of neat (unreinforced) polymeric resins, or extrusion of short and/or continuous fiber-reinforced composites.

Processing of both neat resins and resin coated fibers to form high quality finished articles/components typically requires adhering the extruded rows of material to each other, and to a substrate. The present test station/process can be utilized in additive manufacturing processes that may require robust and, where possible, automated validation of proper adhesion on demand so that the information can be used as part of the feedback loop and to determine the current quality of the feedstock (particularly properties that affect adhesion such as the moisture content), as well as process parameters such as the process temperature, extrusion head height and material feed rate. The present test station/process permits adjustment of these parameters as needed.

With reference to FIG. 1, an extrusion device 25 includes a powered mechanism 26 that moves an extrusion head 2 above a print bead or build platform 4 having a low adhesion coating 6 on an upper surface thereof. Mechanism 26 may comprise one or more linear guides and electrically-powered actuators (not shown) that provide for controlled/powered movement of extrusion head 2 and/or build platform 4. A controller 28 is operably connected to the mechanism 26 to control movement of extrusion head 2 and/or build platform 4 that is generally known in the art. In use, extrusion head 2 may be utilized to apply filament 8 onto coating 6 of build platform 4 to build up layers to form a three dimensional part 30 in an additive "3D printing process." The extrusion device 25 may also include a cutting mechanism 27 that is utilized to cut filament 8 after the required length of filament 8 has been applied to the 3D part 30. The build platform 4, extrusion head 2, mechanism 26, cutting mechanism 27, and controller 28 may be substantially similar to existing components of known 3D printing/extrusion devices, such that a detailed description is not believed to be required herein.

As discussed in more detail below, a test station 1 according to the present disclosure may be utilized to measure and/or calibrate adhesion between rows of extruded material 8A of a 3D component or part 30 to enable closed-loop processing/control of the components of extrusion device 25, Adhesion test station 1 may include test build plates or blocks 14 and 18 that are positioned on or adjacent a main extrusion or build platform or bed 4. Test block 14 includes a coating 16 that is preferably substantially identical to coating 6 on main build platform 4. in the embodiment of FIG. 1, the test station 20 is disposed above main build platform 4. During testing, a test part 30A is fabricated on coating 16 of test block 14 in test station 1.

The test station I includes a. load cell 12 that is configured to measure forces transmitted from. block 14 to block 18 (i.e. forces applied to test block 14 by filament 8A upon movement of extrusion head 2). Block 18 thermally and mechanically isolates test station 1 from the main build platform 4 to ensure accurate measurements, An additional isolation layer or block 22 thermally protects the load cell 12 from heating of the test bed/block 14. Because the test build platy /block 14 is thermally isolated from the main build plate/bed 4, electrical heating elements (not shown) may be utilized to beat build plate/block 14 to ensure that the temperature of test build plate/block 14 can be controlled to replicate temperatures of the main test plate/bed 4. This permits the optimum temperature for extrusion to be determined. The heating and cooling of a smaller test area (e.g. test build plate/block 14) also provides rapid testing and optimization of the extrusion. parameters with minimal power usage.

Build plate block 14 may comprise a suitable material such as glass, metal or ceramic plate, and coating 16 may comprise a polymer film or a polymer based glue that is chosen to be compatible with the material being printed as well as being able to survive without degradation at the printing temperature. Block or layer 22 may comprise glass, metal, ceramic, or a polymer/polymer composite. Build plate/block 14, coating 16, and blocks 18 and 22 may be about 3 inches by about 3 inches. Coating 16 may be about 0.0005 inches thick. Build plate/block 14 may be about 0.125 inches thick, block 18 may be about 0.125 inches, and block 22 may be about 0.125 inches thick. It will be understood that the sizes and materials of these components are not limited to these examples.

Referring again to FIG. 1, a feed control mechanism 10 includes clamps 11A, 11B, and 11C that control motion of the filament 8 during extrusion. Clamps 11A, 11B, and 11C may be loosened to allow the filament 8 to slide freely. Conversely, clamps 11A, 11B, and 11C may clamp down on filament 8 to prevent movement of filament 8 relative to extrusion head 2. Feed control mechanism 10 may include a load cell 9 that is configured to measure tension applied to filament 8 by clamps 11A, 11B, and 11C (e.g. the difference in tension between filament 8 entering feed control mechanism 10 and tension exiting feed control mechanism 10). During testing, clamps 11A, 11B, 11C may clamp down on filament 8, and the extrusion head 2 may be moved relative to plate 14 to control tensile and/or shearing forces applied to the extruded filament 8A below the extrusion head 2. The forces applied to extruded filament 8A and the response of the extruded material 8A lead to changes in the loads measured by the load cells 9 and 12.

Figure 2:
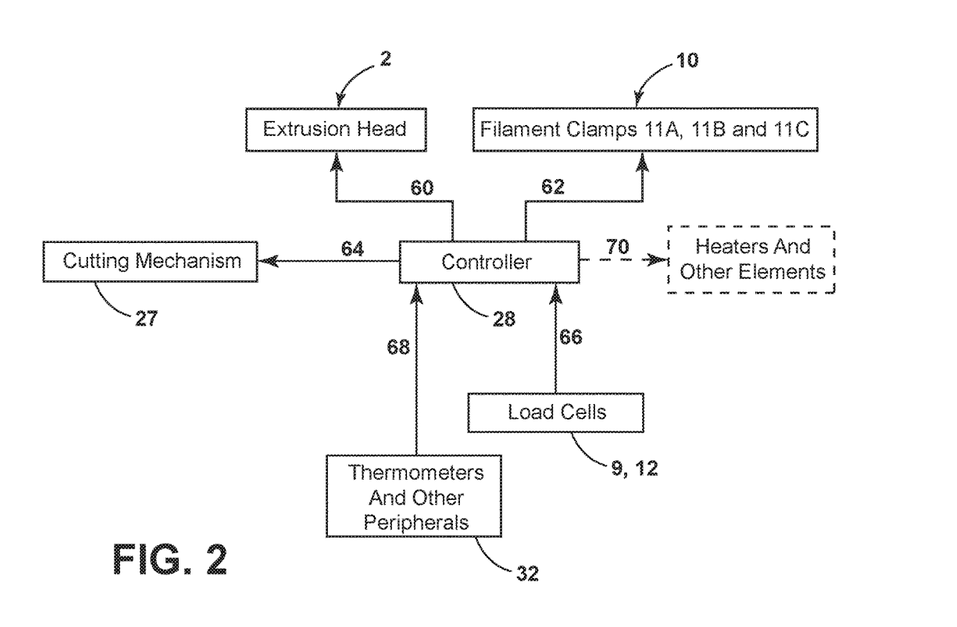
FIG. 2 is a block diagram showing information flow between the components.

Flow of data and control signals between the controller 28 of the extrusion device 25 and the peripherals, including the adhesion test station 1 is shown in FIG. 2. In order to effect a test, control signals 60 and 62 are sent from the controller 28 to the mechanism 26 of extrusion head 2 and to filament clamps 11A, 11B, and 11C. Signal 60 causes extrusion head 2 to move to a specified location and height, and signal 62 causes opening or closing of the clamps 11A, 1B, and 11C to apply a required tension force to filament 8. Controller 28 is also configured to actuate cutting mechanism 27 to cut filament 8 after a required length of filament 8 has been extruded. Information/measured load data 66 concerning the loads generated during this process is sent from the load cells 9 to the controller 28. Additional information or data 68 concerning the state of the extrusion device 25 (e.g. temperature) measured by thermometers and/or other peripheral devices 32 is also sent to the controller 28.

Controller 28 is configured to process the signals from the various input sources and send signals 70 to adjust the parameters of the extrusion process. These parameters may include the extrusion temperature, extrusion head height, feed rate and the force/power/speed of cutting device 27. For example, testing may be conducted to determine the relationship between the temperature of extrusion head 2 and force required to pull filament 8 away from coating 16 of plate 14. If a force measured by test station 1 is outside of an expected (acceptable) range, the temperature of extrusion head 2 can be increased or decreased as required to cause the measured force to fall within the acceptable range. A series of tests may be conducted in test station 1 until an acceptable force is achieved, and the conditions utilized to fabricate a part on main platform 4 can then be adjusted to match the conditions of test station 1 that produce acceptable results. Adjustment of process parameters in test station 1 may be based, at least in part, on known/expected effects. Adjustment of process parameters in test station 1 may also be based, at least in part on trial and error.

Figure 3:
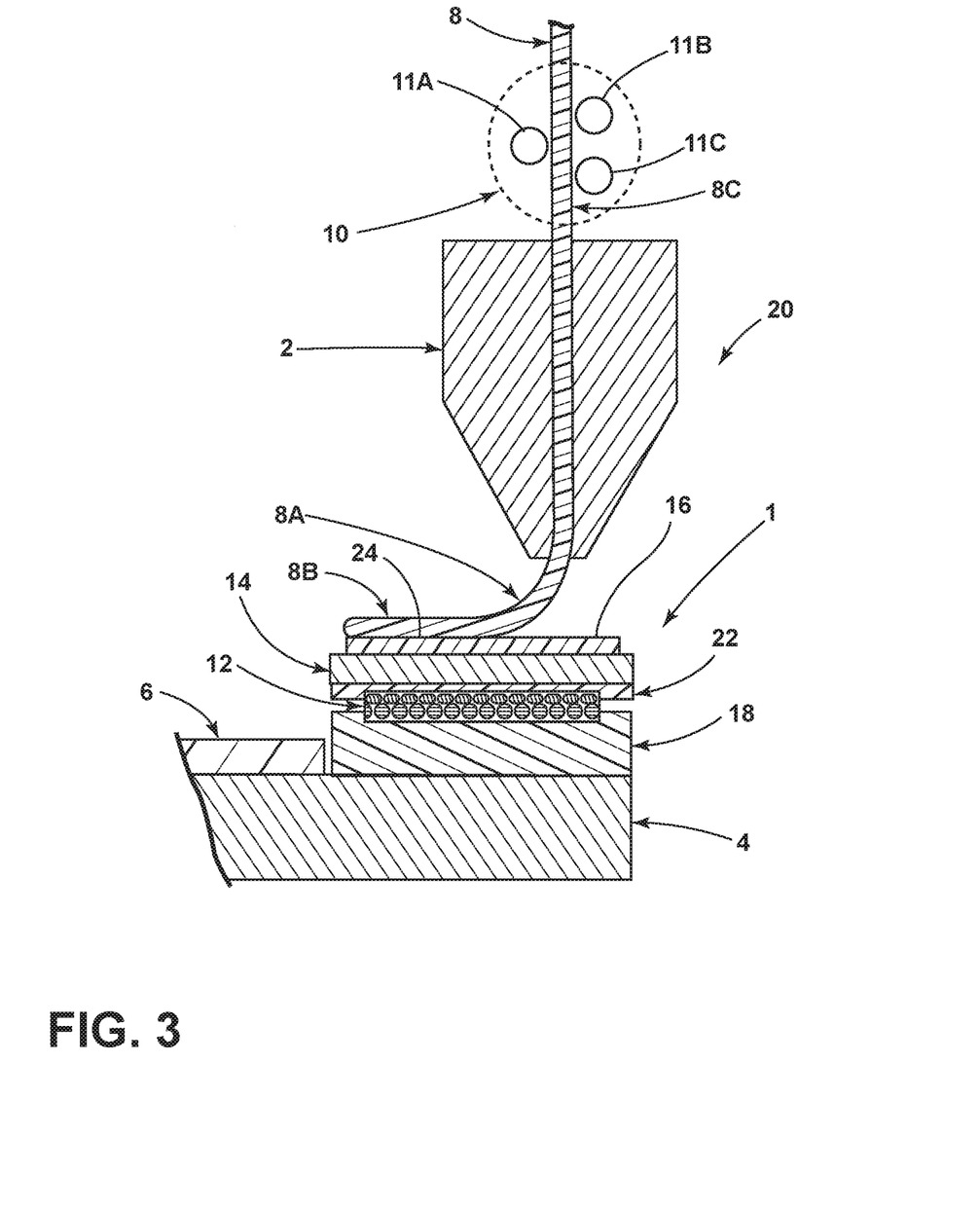
FIG. 3 is a partially schematic cross sectional view of the test station during testing of the adhesion between the extruded material and a substrate.

With reference to FIG. 3, the adhesion test station 1 may also be configured to test adhesion of an extruded row of material 8B to coating 16 of plate 14. The material of the coating 16 on the test station build plate 14 is chosen to be the same as that of the coating 6 on the main build platform 4.

Figure 4:
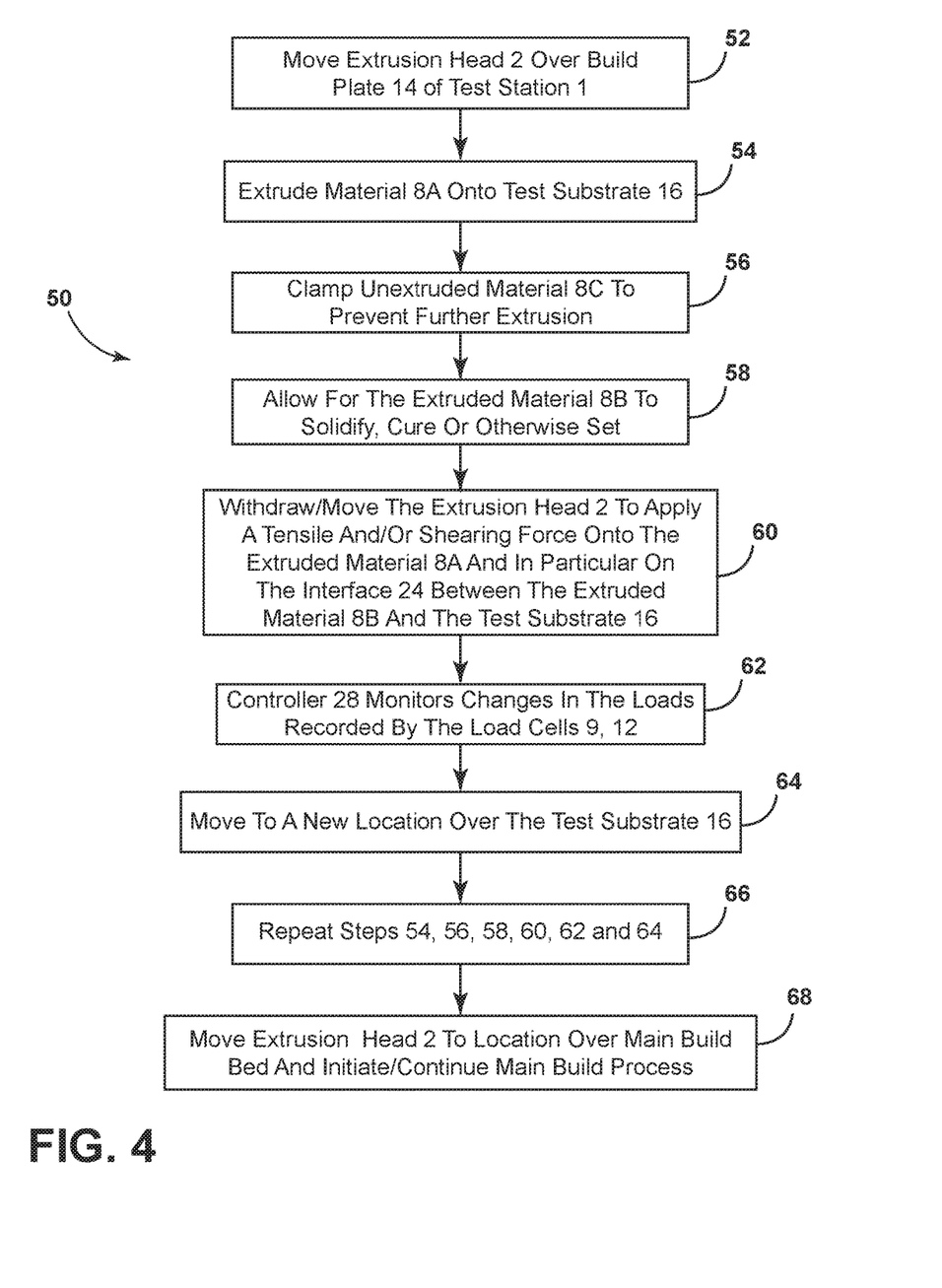
FIG. 4 is a block diagram showing a test process for the arrangement of FIG. 3.

The configuration of FIG. 3 may be utilized in connection with a process 50 (FIG. 4). In particular, process 50 may be utilized to test adhesion between the extruded material and coating material 16 of plate 14. This adhesion corresponds to the adhesion between the extruded material and coating 6 of build plate 4. Testing process 50 includes preliminary activities at step 52. Step 52 may include changing of the substrate layers 6 and/or 16, adjustment of the extrusion. parameters, and preparation of the substrate 16 on the build plate 14 of test station I. During step 52. the extrusion head 2 then moves over the plate 14 of test station 1. At step 54, material 8A is extruded onto the coating 16 of plate 14. At step 56, clamps 11A, 11B, and 11C are actuated to clamp un-extruded material to prevent any further extrusion, The extruded material may be allowed to cod down and solidify or otherwise set at step 58. Step 58 may include photo curing of extruded resin or other solidification processes/mechanisms known in the art. The data from a test in which the extruded material is not fully solidified may be interpreted as providing the deformation. and flow of the extruded filament material as well as adhesion. At step 60, the extrusion head 2 is then withdrawn (moved relative to plate 14) to tension extruded material. 8A and apply a force to the interface 24 between the extruded material 30A (FIG. 1) and the surface of coating 16 of plate 14. As shown at step 62, the load cells 9 and/or 12 of the test station 1 are utilized to monitor the changes in the load during movement of extrusion head 2. Monitoring may be done by controller 28 or other suitable computing device that is operably connected load cells 9 and/or 12. For a new test (step 64). the extrusion head 2 is moved to a new location on the substrate (coating 16) and steps 54, 56, 58, 60, 62 and 64 are repeated as many times as is required at step 66. Parameters of the extrusion process such as the filament feed rate, the extruder temperature, the build height, the temperature or the extrusion environment and/or the bed temperature can be adjusted during this move. Upon completion of the test, the extrusion head. 2 moves to the main build bed platform 4 and the parameters obtained from the testing can be used in main build process 68.

Figure 5:
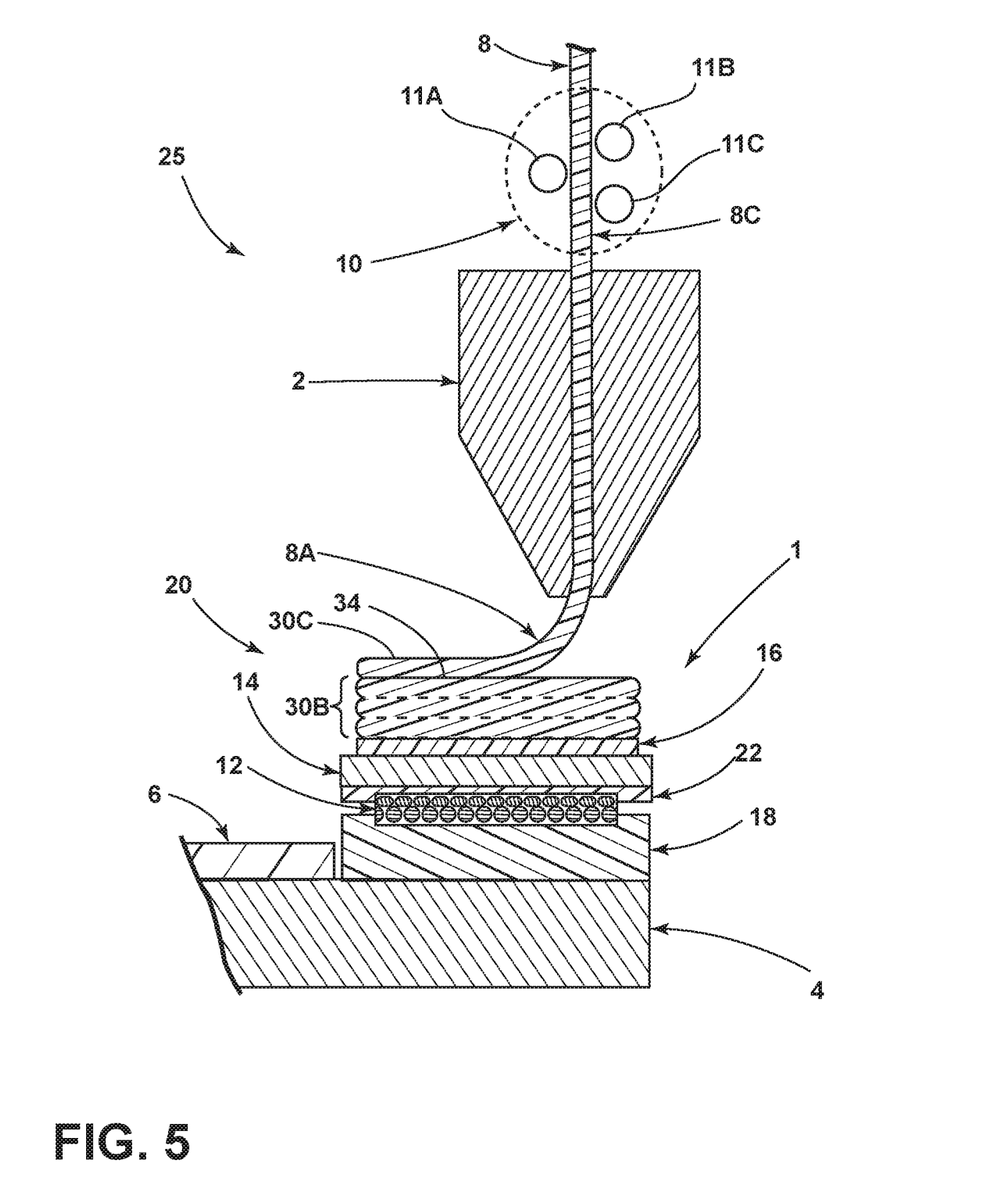
FIG. 5 is a partially schematic cross sectional view of the test station during testing of the adhesion between previously extruded rows of material and a freshly extruded row of material.

With reference to FIG. 5, the adhesion test 1 may be configured to test the adhesion of a freshly extruded row of material 30C to previously extruded material 30B. As discussed above, feed control mechanism 10 may include a load cell 9 that is configured to measure tension applied to filament 8 by clamps 11A, 11B, 11C. Thus, load cell 9 measures the difference in tension between filament 8 entering feed control mechanism 10 and tension exiting feed control mechanism 10. For clarity, controller 28, mechanism 26, and cutting mechanism 27 are not shown in FIG. 5. However, it will be understood that these components of extrusion device 25 may be utilized in the test device and process of FIGS. 5 and 6. In FIG. 5, part 30B includes individual layers that are separated by dashed lines. It will be understood that parts may generally be fabricated by applying polymer material in rows and layers. However, the extruded polymer material of the layers applied during the fabrication process preferably flows and/or bonds together to form a substantially continuous part that does not include distinct layers. Thus, as used herein, the term "layers" generally refers to a sequential buildup of material to form a part, but this term is not limited to any specific layers or final part configuration.

Figure 6:
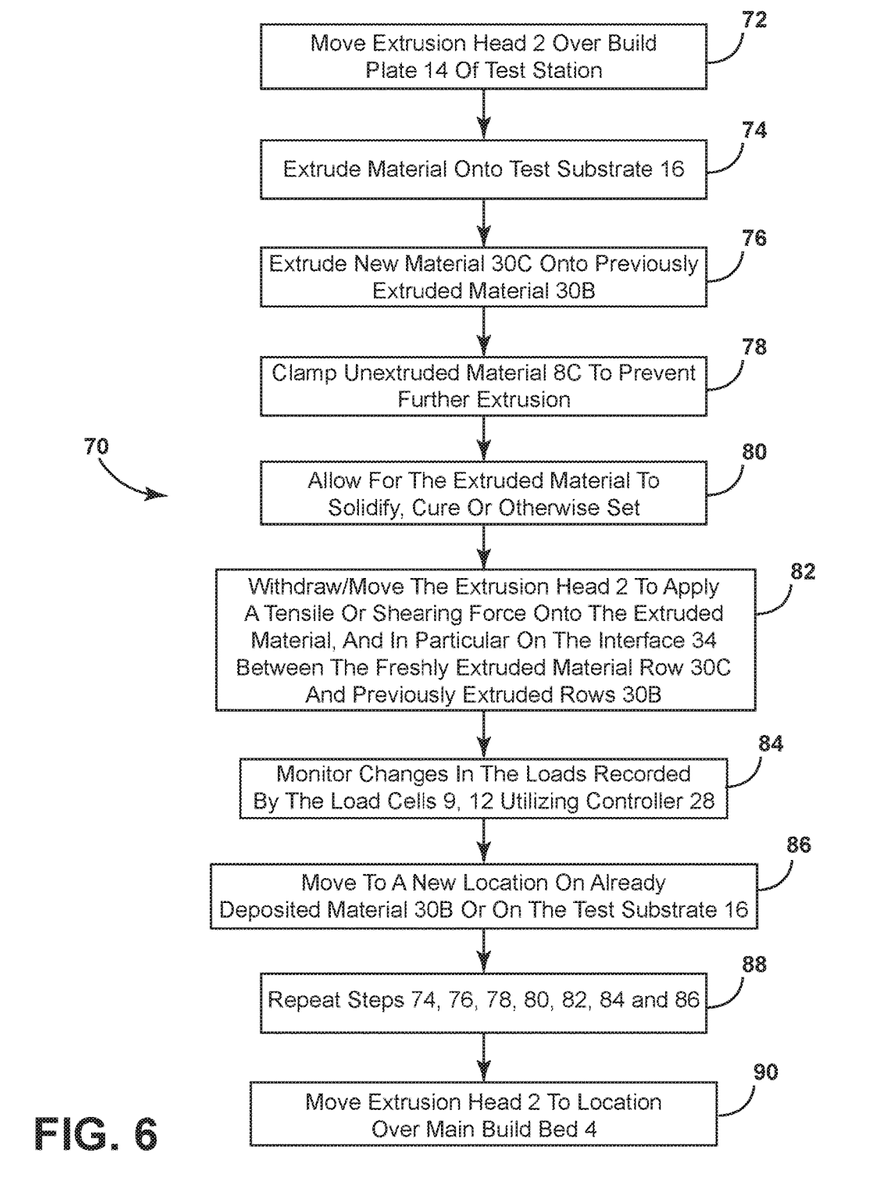
FIG. 6 is a block diagram of a process for testing the adhesion between previously extruded rows of material and a freshly extruded row of material.

Process 70 (FIG. 6) tests the adhesion of a freshly extruded row 30C of material to previously extruded material 30B. The testing includes preliminary activities at step 72, which may include changing of the test substrate layer 16 and adjustment of the extrusion parameters. The extrusion head 2 then moves over the build plate 14 of test station 1 and extrudes material 8A onto the test substrate 16 at step 74. At step 76, an additional row of material is then extruded onto the material that was previously extruded at step 74. Clamps 11A, 11B, 11C are then actuated to clamp un-extruded material to prevent any further extrusion. At step 80, the extruded material 30C may be allowed to cool and solidify or otherwise set. Step 80 may include photo curing of a resin or other solidification/curing/consolidation mechanisms known in the art. The data from a test in which the extruded material is not fully solidified may be interpreted as providing the deformation and flow of the extruded filament material as well as adhesion. At step 82, the extrusion head 2 is then withdrawn/moved to apply tensile and/or shearing force at the interface 34 between the freshly extruded material 30C and previously extruded material 30B. The load cells 9, 12 of the test station 1 monitor the changes in the load during this process at step 84. For a new test (step 88), the extrusion head 2 moves to a new location over the test substrate 16 or previously extruded material 30C at step 28, and steps 74, 76, 78, 80, 82, 84, and 86 are repeated as many times as is required. It will be understood that step 74 is only repeated if the new test is being conducted to test adhesion with test substrate 16. Parameters of the extrusion process can be adjusted during testing until an acceptable result (measured load) is achieved. As shown at step 90, upon completion of the test, the extrusion head 2 moves to the main build bed 4 and the parameters obtained from the testing can be used in the main build process.

Figure 7:
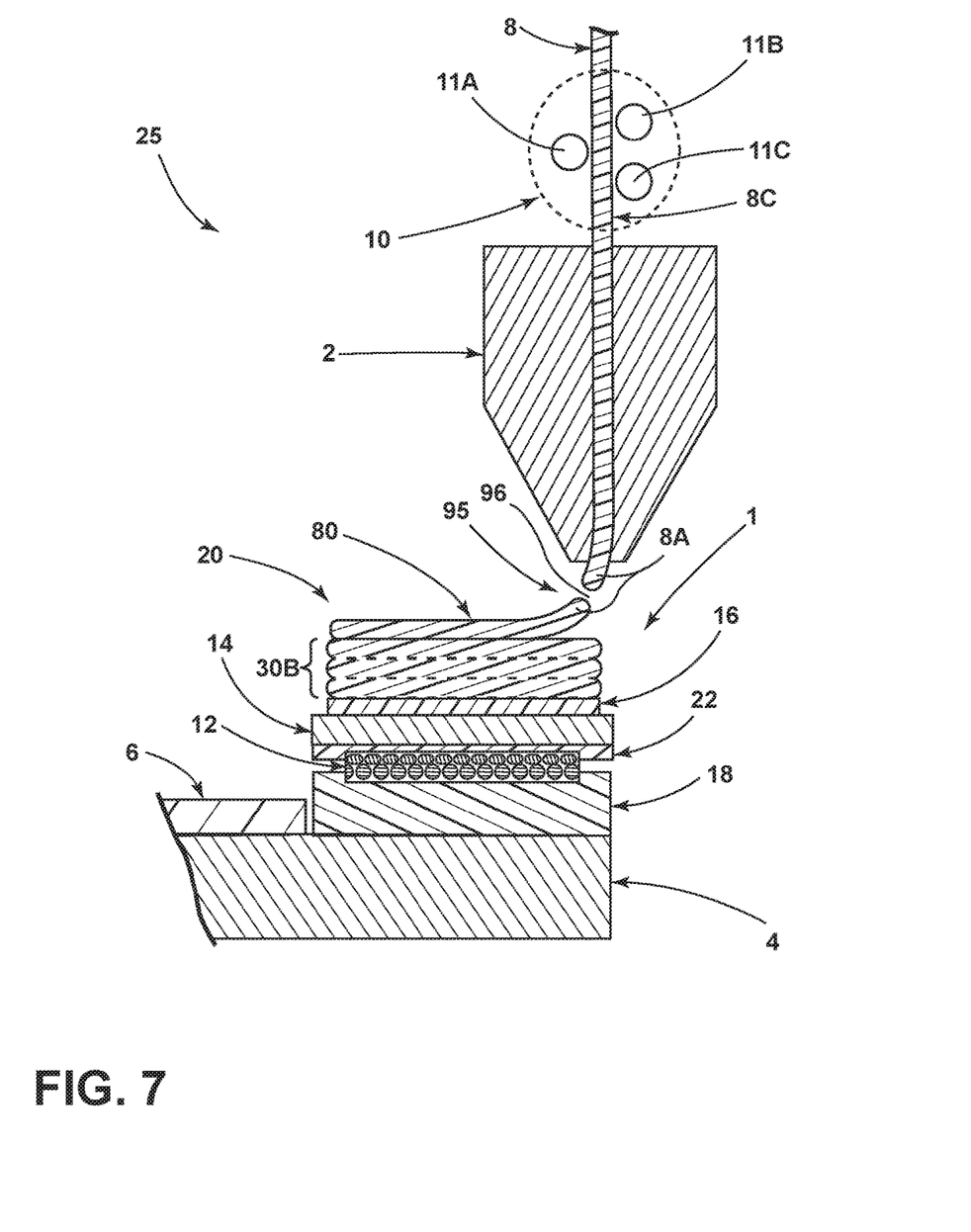
FIG. 7 is a partially schematic cross sectional view of the test station taking force measurements during a cutting process.
Figure 8:
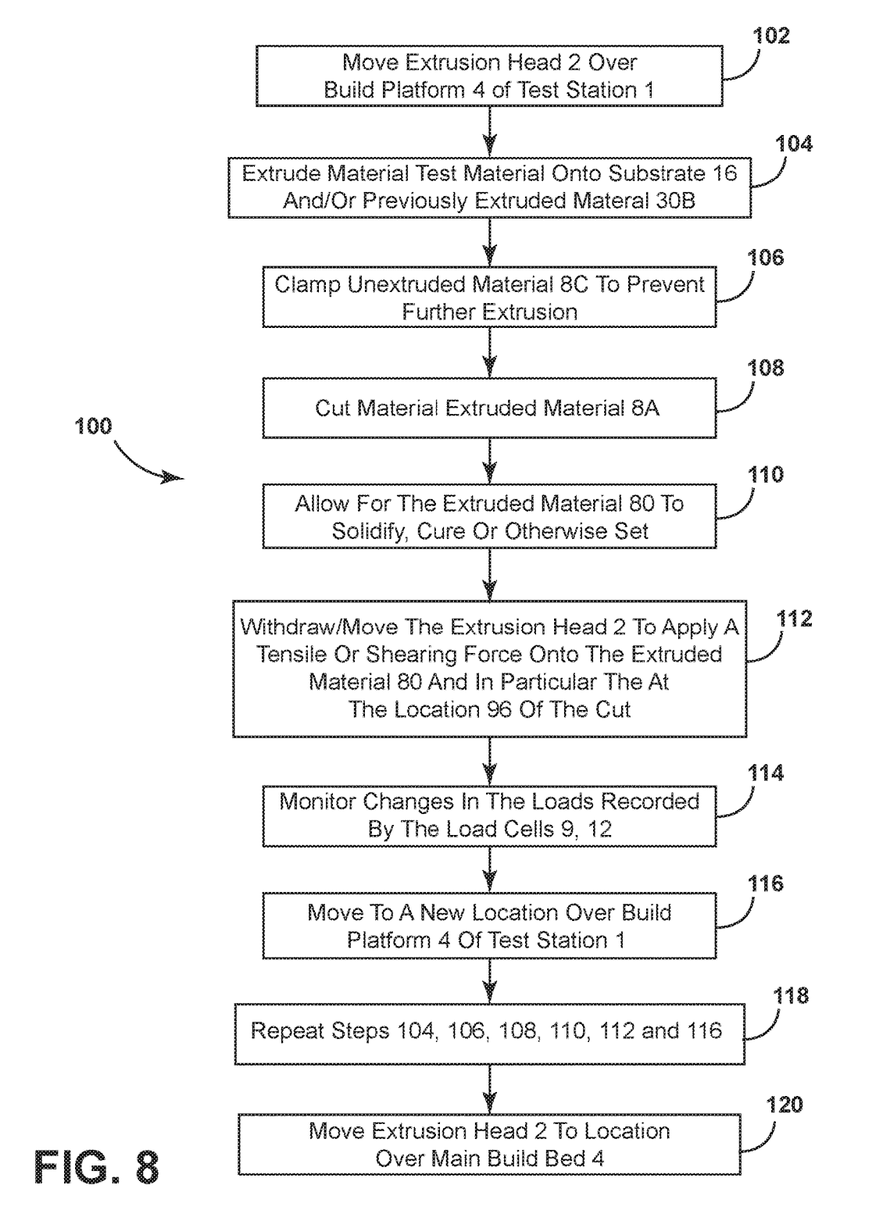
FIG. 8 is a block diagram of a process for force measurements during a cutting process.

With reference to FIG. 7, the adhesion test station 1 may be configured to determine if a clean test for cut 95 of the extruded material 8A has been achieved. Process 100 (FIG. 8) may be utilized in the test set up of FIG. 7. Test process 100 may include any required preliminary activities that may need to be performed prior to step 102. Preliminary activities may include changing of the test substrate layer 16 and adjustment of the extrusion parameters. The extrusion head 2 is then moved over the build plate 14 of test station 1 at step 102, and extrusion head 2 extrudes material onto the substrate 16 at step 104. At step 106, unextruded material is then clamped utilizing clamps 11A, 11B, and 11C to prevent any further extrusion. A cutting action is then effected at step 108 by a suitable cutting mechanism 27 (FIG. 1) mounted on to the extrusion apparatus 25. At step 110, the cut material is then allowed to cool down and solidify or otherwise set. At step 112, the extrusion head 2 is then withdrawn to apply a tensile or shearing force at the cut interface 8. At step 114 controller 28 and the load cells 9, 12 in test station 1 monitor the changes in the load during this process. If cut interface 95 (FIG. 7) completely severs the filament 8 to form a gap 96, the measured load will be zero. For a new test, the extrusion head moves to a new location on the test station (step 116) and steps 104, 106, 108, 110, 112, 116, and 118 are repeated as many times as is required. Parameters of the extrusion can be adjusted during this move. Upon completion of the test, the extrusion head moves to the main build bed and the parameters obtained from the testing can be used in the main build process (step 120).

Figure 9:
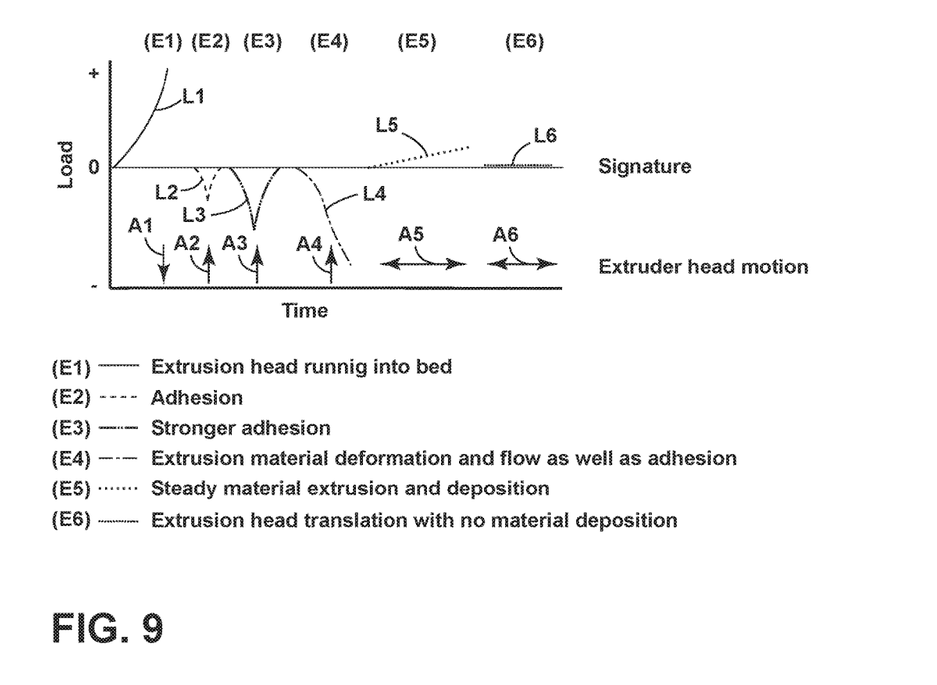
FIG. 9 shows simulations of load signatures corresponding to various events during the test process.

FIG. 9 shows simulated load signatures (lines L1-L6) corresponding to various events E1-E6, respectively, on the adhesion test station 1. Arrows A1-A6 show the direction of movement of extrusion head 2 relative to the print bead (e.g. build plate 14) during events E1-E6, respectively. The load signatures L1-L6 are for an adhesion test station 1 having a load cell that is configured to indicate an increase in load when a downward (compressive) force is applied to the print bed (e.g. build plate 14). Interpretation of the events is achieved by correlating the measured load with motion of the extrusion head 2. When the extrusion head 2 is moving downward (arrow A1) a sharp increase in the load (event E1) indicates the head has run into the print bed (e.g. build plate 14) as shown by line L1. During an event E2, the head 2 moves away from the bed (block 14) and pulls on previously extruded material, and a drop in the load below a reference value (line L2) gives a measure of the adhesion/tensional load on the extruded material. The magnitude of the adhesion is related to the change in load as shown by events (2) and (3) and corresponding lines L2 and L3, respectively. Deformation and flow of the softened extrusion filament (event E4) may be indicated (detected) by changes in the tensional load while the extrusion head is moving away from the test bed as shown by line L4. A steady deposition of material (event E5) is indicated (detected) by a steady rise in the load while the head is translating horizontally as shown by line L5. Motion of the head 2 without any material being deposited (event E6) results in constant load as shown by line L6.

Figure 10:
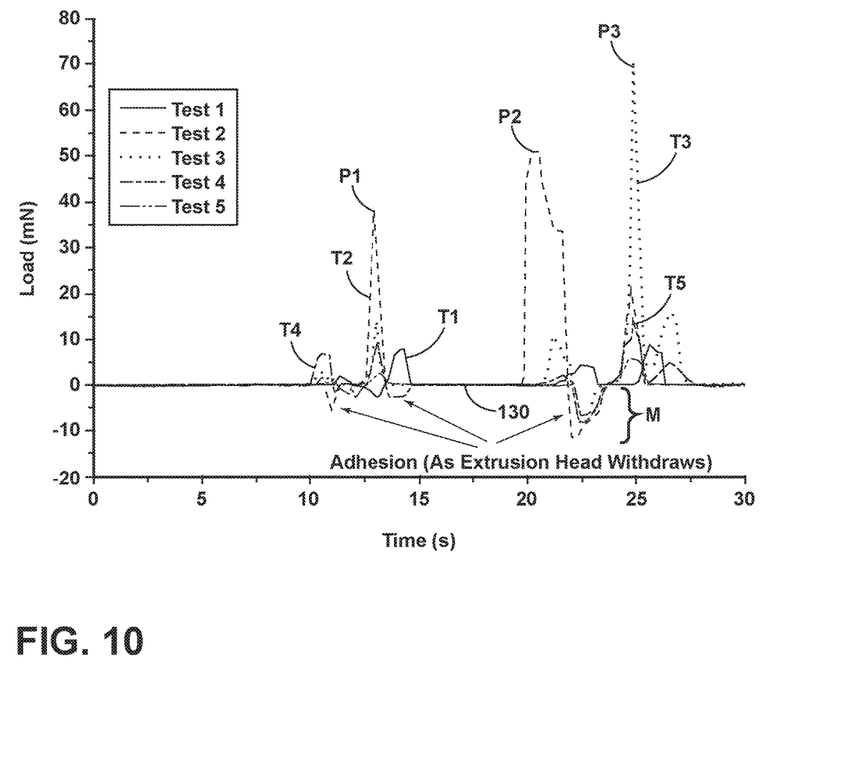
FIG. 10 is a graph showing loads measured during testing.

FIG. 10 shows examples of loads measure during the operation of adhesion test station 1. In an embodiment of the invention, compensation can be made for the spurious changes in the load due to the acceleration and deceleration of the extrusion head 2 and/or print bed (build platform 4). Such compensation may be made by monitoring when these accelerations are occurring in the print code and/or obtaining data from accelerometers mounted on the extrusion head 2 and/or print bed (e.g. build platform 4). In FIG. 10, lines T1-T5 show measured loads for tests 1-5, respectively. The increases or peaks in measured force P1, P2, and P3 are caused by movement of extrusion head 2 into the print bed (e.g. build platform 4 or plate 14). The portions of lines T1-T5 below the zero load line show adhesion as the extrusion head 2 withdraws. In the illustrated example, the magnitudes M of the adhesion forces varies somewhat for each test.

It is to be understood that variations and modifications can be made on the aforementioned structure without departing from the concepts of the present invention, and further it is to be understood that such concepts are intended to be covered by the following claims unless these claims by their language expressly state otherwise. For example, the changes in the torque of a motor feeding material (filament 8) to the extrusion head 2 may be used to infer the loads at the extruded row or cut interfaces, in addition to or in place of the load cells 9, 12.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A method of controlling an additive fabrication process, the method comprising:
    providing a primary substrate and a test substrate;
    feeding non-extruded polymer material into an extrusion head;
    extruding a test portion of the polymer material onto the test substrate utilizing the extrusion head;
    allowing or causing the extruded polymer test material to solidify or cure;
    fixing the non-extruded polymer material relative to the extrusion head;
    moving the extrusion head relative to the test substrate;
    measuring a force required to move the extrusion head relative to the test substrate to generate test data;
    fabricating a 3D part by extruding the polymer material onto the primary substrate utilizing the extrusion head; and
    utilizing the test data to control at least one process parameter associated with extruding the polymer material onto the primary substrate.

2. The method a claim 1, wherein:
    the polymer material comprises thermoplastic polymer material that is heated to soften the material prior to extrusion.

3. The method of claim 1, wherein:
    the polymer material comprises thermosetting polymer material that is extruded in an uncured or partially cured state, and cures after extrusion.

4. The method of claim 1, wherein:
    the polymer test material is extruded directly onto the test substrate to form an interface at which the test material contacts the test substrate, and wherein movement of the extrusion head applies a force to the interface.

5. The method of claim 4, wherein:
    the force applied at the interface is at least one of a tensile force or a shearing force.

6. The method of claim 1, wherein:
    the extruded polymer test material on the test substrate forms previously extruded test material;
    further comprising extruding additional polymer test material into contact with the previously extruded test material to form an interface at which the additional polymer test material contacts the previously extruded test material; and
    wherein moving the extrusion head applies the force to the interface.

7. The method of claim 6, wherein:
    the force applied at the interface comprises at least one of a tensile force and a shearing force.

8. The method of claim 6, wherein:
    an underlying interface is formed between the extruded polymer material and the test substrate.

9. The method of claim 1, including:
    at least partially cutting the extruded polymer test material between the extrusion head and the test substrate prior to measuring the force required to move the extrusion head relative to the test substrate.

10. The method of claim 1, including:
    providing a 3D printing device, and:
    wherein the primary substrate and the test substrate comprise coatings of substantially identical materials on a primary build platform of the 3D printing device and on a test build plate positioned adjacent the primary build platform, respectively.

11. The method of claim 10, including:
    utilizing one or more load cells that are operably connected to a controller of the 3D printing device to measure the force required to move the extrusion head.

12. The method of claim 11, including:
    utilizing programmed motions of the extrusion head and the force measured by the load cells to determine the extruded material deformation and flow as well as adhesion.

13. The method of claim 10, including:
    utilizing one or more accelerometers that are mounted on the 3D printing device and operably connected to a controller of the 3D printing device to measure the force required to move the extrusion head; and
    utilizing data from the accelerometers to compensate for the forces due to the acceleration/deceleration of the extrusion head, the test substrate, or both, in calculating the extruded material deformation and flow as well as adhesion.

14. The method of claim 13, including:
    operably connecting a load cell to the primary substrate and the test substrate.

15. The method of claim 1, wherein:
    the process parameter includes at least one of a temperature of the extrusion head, temperature of the test substrate, temperature of a printing environment, a vertical distance between the extrusion head and the primary substrate, a feed rate of the polymer material through the extrusion head, and a power supplied to a cutting device.

16. The method of claim 1, wherein:
    the additive fabrication process comprises a 3D printing process that is utilized to fabricate the 3D part on the primary substrate;
    the polymer test material is extruded before fabrication of the 3D part on the primary substrate.

17. A method of controlling an additive fabrication process, the method comprising:
    providing a primary substrate and a test substrate that is thermally and mechanically isolated from the primary substrate;
    feeding non-extruded polymer material into an extrusion head;
    extruding a new test portion of the polymer material onto the test substrate, or onto an existing extruded test portion of the polymer material, by use of the extrusion head;
    allowing or causing the new extruded polymer test material to solidify or cure;
    fixing the non-extruded polymer material relative to the extrusion head;
    displacing the extrusion head relative to the test substrate;

measuring a force required to move the extrusion head relative to the test substrate to generate test data;

fabricating a 3D part by extruding the polymer material onto the primary substrate by use of the extrusion head; and using the test data to control at least one process parameter associated with extruding the polymer material onto the primary substrate.

\* \* \* \* \*